United States Patent [19]

Holcomb et al.

[11] Patent Number: 5,319,805
[45] Date of Patent: Jun. 7, 1994

[54] CONCEALED RADIO TRANSMITTER IN A TAPEMEASURE

[75] Inventors: Jack N. Holcomb; Konrad K. Pangratz, both of Ft. Lauderdale, Fla.

[73] Assignee: Westinghouse Electric Corp., Baltimore, Md.

[21] Appl. No.: 991,947

[22] Filed: Dec. 17, 1992

[51] Int. Cl.$^5$ ............................................. H04B 1/03
[52] U.S. Cl. .................................... 455/128; 455/90; 455/347
[58] Field of Search ............. 455/95, 97, 100, 128, 455/344, 347, 66, 89, 90, 351; 358/108; 33/761, 769

[56] References Cited

U.S. PATENT DOCUMENTS

| | | | |
|---|---|---|---|
| 4,831,438 | 5/1989 | Bellman, Jr. et al. | 358/108 |
| 4,991,225 | 2/1991 | Holcomb et al. | 455/90 |
| 4,996,787 | 3/1991 | Holcomb et al. | 42/7 |
| 5,001,772 | 3/1991 | Holcomb et al. | 455/90 |

*Primary Examiner*—Reinhard J. Eisenzopf
*Assistant Examiner*—Nguyen Vo
*Attorney, Agent, or Firm*—Oltman and Flynn

[57] ABSTRACT

According to the invention there is provided a concealed radio transmitting device which includes a radio transmitter, an antenna coupled to the radio transmitter, power supply for supplying electric power to the transmitter, an on/off device connected between the power supply and the radio transmitter, and a housing shaped as a tape measure adapted for containing the radio transmitter, the antenna, the power supply and the on/off device, and wherein further the concealed radio transmitting device includes in the radio transmitter an audio input, and a microphone connected to the audio input for transferring audio signals to the transmitter.

12 Claims, 5 Drawing Sheets

CONCEALED RADIO TRANSMITTER IN A TAPEMEASURE

The invention relates to a concealed radio transmitting device built into a tapemeasure housing, and more particularly a radio transmitter equipped with a microphone for transmitting voice.

BACKGROUND OF THE INVENTION

In surveillance work it is sometimes necessary to employ a radio transmitter that can be concealed so as not to attract unwanted attention.

Concealment of small radio transmitters in unobvious locations is known in the art. Various difficulties, however, must be overcome in concealment, since the radio transmitter requires for its operation both power supply devices and an antenna and other parts that tend to be bulky.

It is therefore an object of the present invention to provide a radio transmitter that is both concealable in a small enclosure which is unobtrusive, yet provides enough radiated energy to be readable at a distance sufficient to allow inconspicuous monitoring and has adequate stored electrical energy to remain in operation for the length of time required for most surveillance operations, i.e. at least several hours.

Applicant has found that a conventional tape measure housing with suitable modifications can provide an enclosure for a concealed radio transmitter adapted to fit into the tape measure housing.

SUMMARY OF THE INVENTION

According to the invention there is provided a concealed radio transmitting device which includes a radio transmitter, an antenna coupled to the radio transmitter, power supply means for supplying electric power to the transmitter, an on/off device connected between the power supply means and the radio transmitter, and a housing shaped as a tape measure adapted for containing the radio transmitter, the antenna, the power supply means and the on/off device, and wherein further the concealed radio transmitting device includes in the radio transmitter an audio input, and a microphone connected to the audio input for transferring audio signals to the transmitter.

According to a further feature there is provided a concealed radio transmitting device which includes in the power supply means at least one electric battery connected to the on/off switch.

According to still another feature the concealed radio transmitting device includes in the radio transmitter an audio circuit, a radio frequency oscillator with an input connected to the audio circuit, and a radio frequency amplifier having an input connected to the oscillator and an output connected to the antenna.

The concealed radio transmitting device can include a second printed circuit board assembly for mounting the antenna, which is structured e.g. as a printed circuit board with first and second interconnected antenna loops disposed on the antenna printed circuit board, and a coaxial connection from the radio transmitter to the antenna, and may further include a tuning capacitor connected to one of the antenna loops for tuning the antenna to maximum output.

The on/off device can be any type switch, e.g. a push-on-switch or the like.

According to still another feature the transmitting device includes in the housing at least one compartment for containing the power supply means, and at least one other compartment for containing the radio transmitter, and the antenna.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

Figure 1:
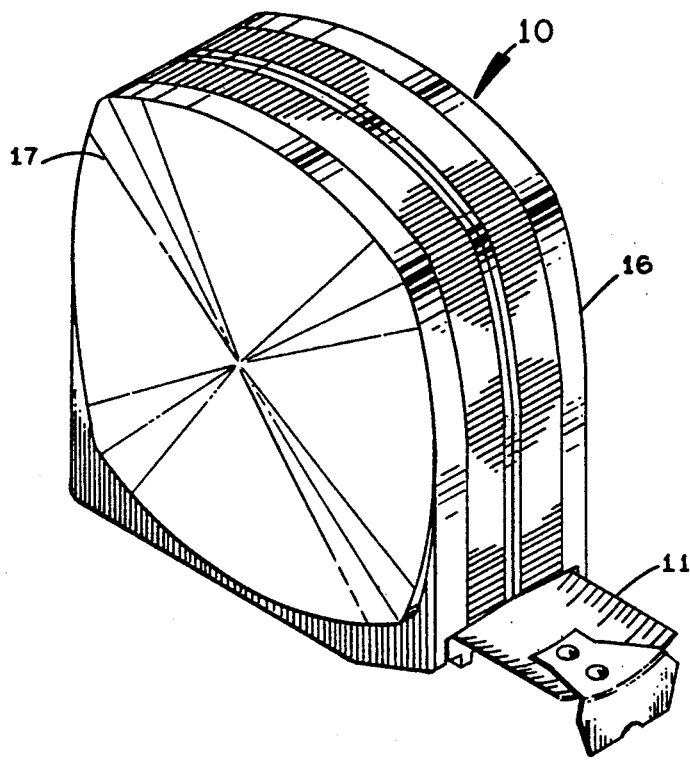
FIG. 1 is a perspective view of the invention showing a tape measure housing seen from the tape outlet side.
Figure 2:
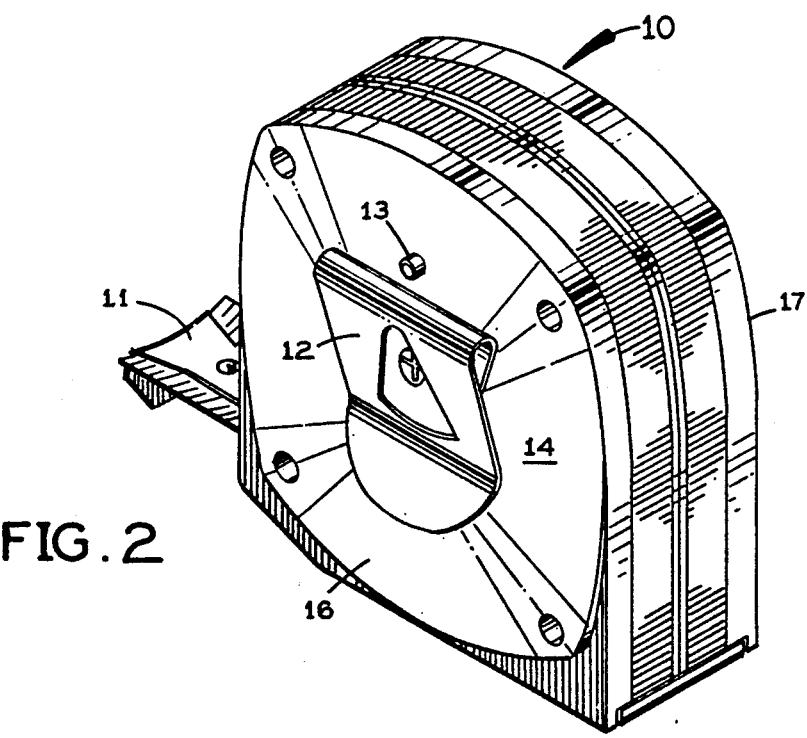
FIG. 2 is a perspective view of the invention showing a tape measure housing seen from the opposite side of FIG. 1.

In FIGS. 1 and 2 a tape measure housing is seen respectively from the tape outlet side and from the opposite side. A small part of the short tape section 11 is shown partly extended. A conventional belt clip 12 enables the wearer of the tape housing to clip it onto a conventional waist belt. A small inconspicuous button 13 of an on/off switch extends through one side 14 of the tape measure housing 10 for activating an internal radio transmitter built into the housing.

Figure 3:
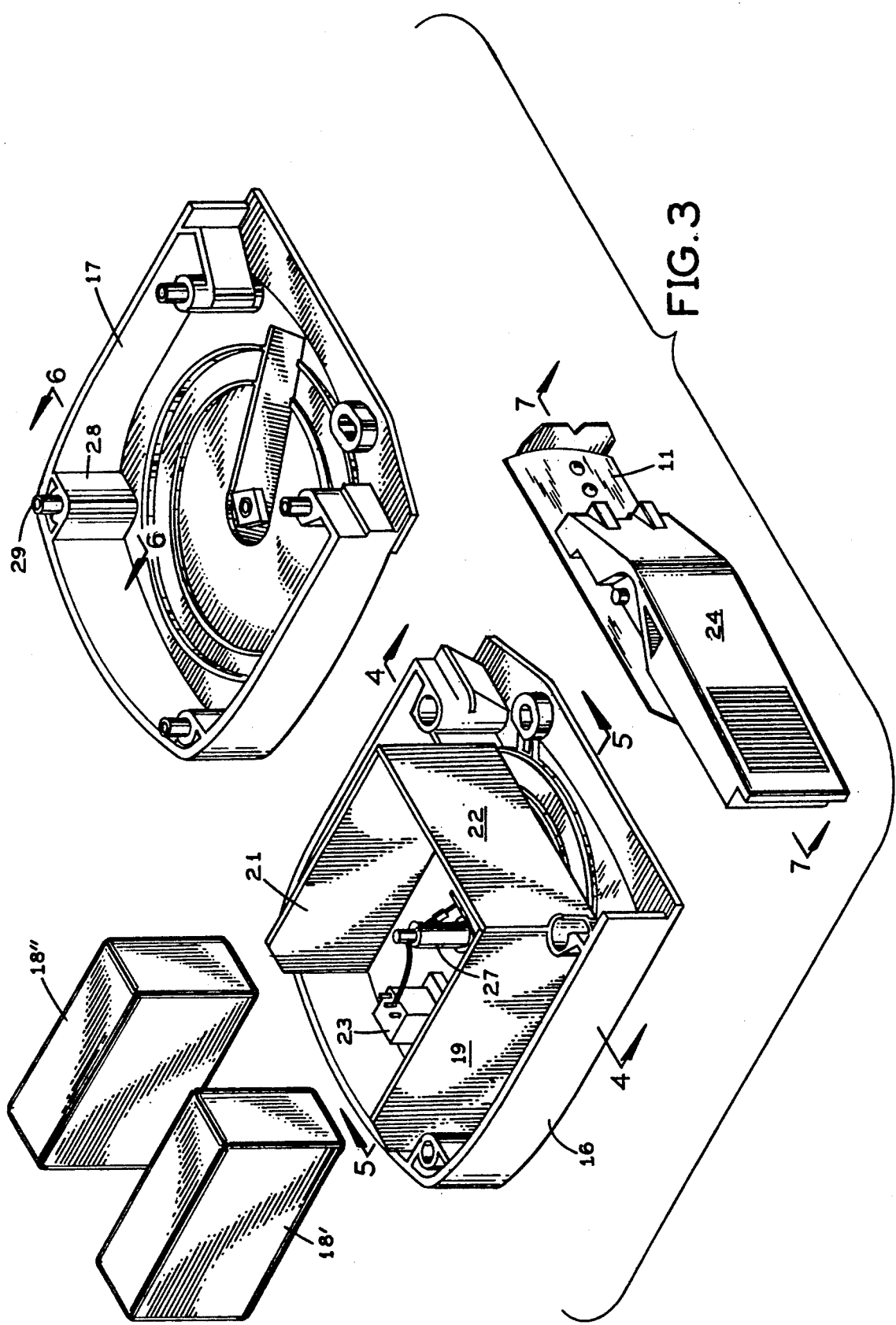
FIG. 3 is an exploded view showing a tape measure housing with various parts of the concealed transmitter.

FIG. 3 shows details of the construction of the tapemeasure housing 10, which is formed of respective first cover part 16 adapted to receive two interconnected dry cell batteries 18' and 18", preferably of the alkaline type as well known for use in small transistorized appliances. The original tapemeasure proper has been removed with only a small tape section 11 remaining which can be extended a short distance from the tape housing. The space made available inside the tape housing has been equipped with three partitions 19, 21, 22 forming compartments that serve to contain the batteries 18', 18" and to support the various parts of the radio transmitter as described below. The body of the on/off switch is shown at 23, and a variable antenna tuning capacitor 27 is shown in the center of the housing. An end part 24 of the housing supports the small tape section 11, which is slidably mounted on the inside surface of the end part 24.

Figure 4:
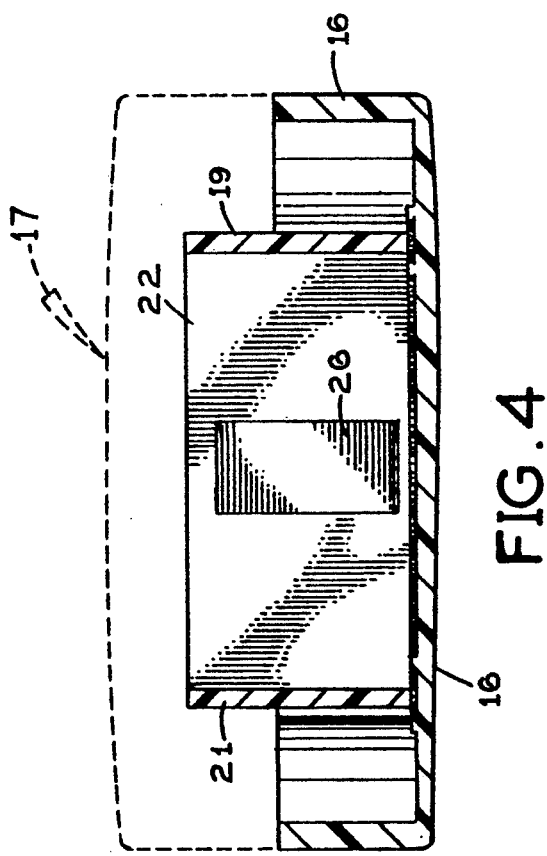
FIG. 4 is a cross-sectional view of the invention seen along the line 4—4 of FIG. 3.

FIG. 4 is a cross section of the first cover part 16 seen along line 4—4 of FIG. 3, showing in cross section partitions 19, 21 and the inside surface of partition 22, which holds a spacer 26 that separates the batteries 18', 18", not seen in this figure. The second cover part 17 is shown in phantom line.

Figure 5:
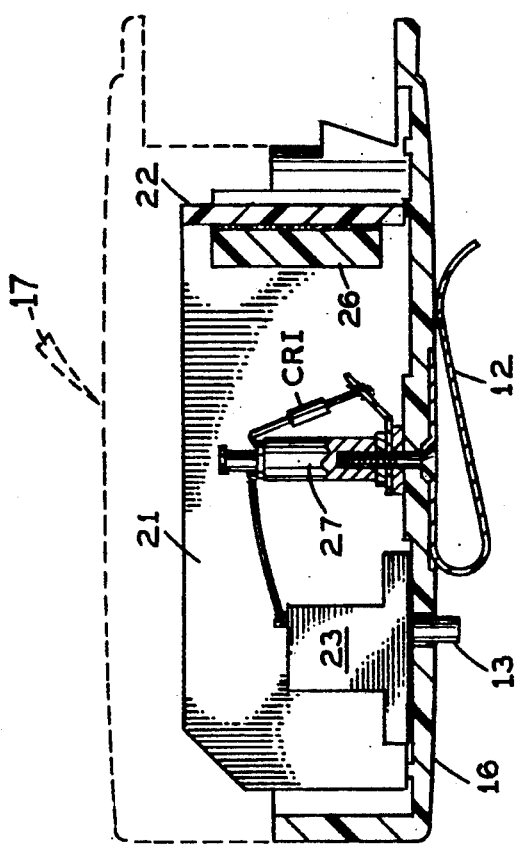
FIG. 5 is a cross-sectional view of the invention seen along the line 5—5 of FIG. 3.

FIG. 5 is a cross section of the first cover part 16 seen along the line 5—5 of FIG. 3, showing in section the spacer 26, partition 22 and the inside surface of partition 21, and again the body 23 of the on/off switch, the tuning capacitor 27, and the beltclip 12 in section.

Figure 6:
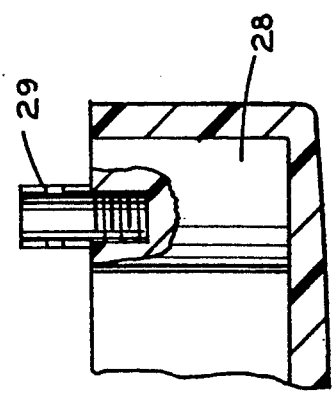
FIG. 6 is a fragmentary detail view seen along the line 6—6 of FIG. 3 showing a corner of the housing.

FIG. 6 is a fragmentary detail of the housing seen along line 6—6 of FIG. 3, showing one of the housing corner bosses 28 with a threaded post insert 29 for holding the first and second cover parts 16, 17 in alignment.

Figure 7:
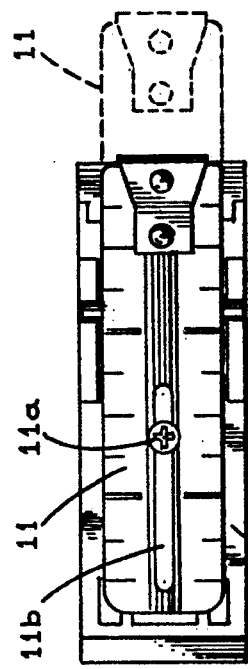
FIG. 7 is an elevational cross-sectional view of the invention showing details of the tape mounting in the tape housing, seen along the line 7—7 of FIG. 3.

FIG. 7 is a view seen along line 7—7 of FIG. 3, showing the inside of the housing end part 24, with the tape section slidably retained by means of a slot 29 in the tape section 11, which is retained by a screw 31 through the slot 29. An end of the tape is shown slightly extended in phantom lines 11.

Figure 8:
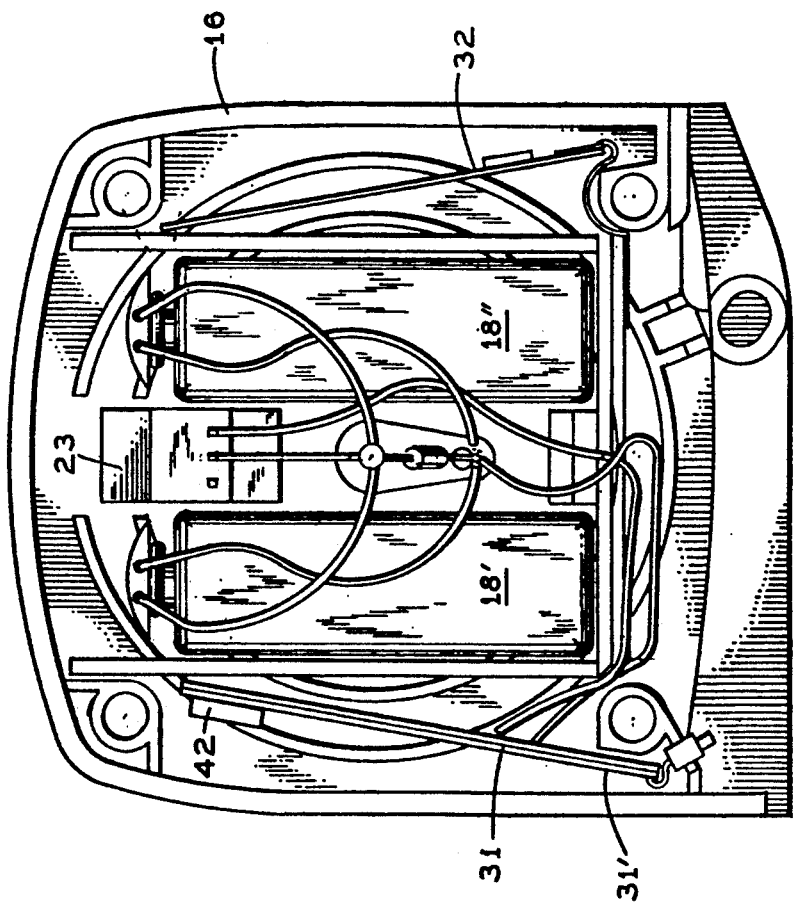
FIG. 8 is a plan view of the invention showing details of the interior construction.
Figure 11:
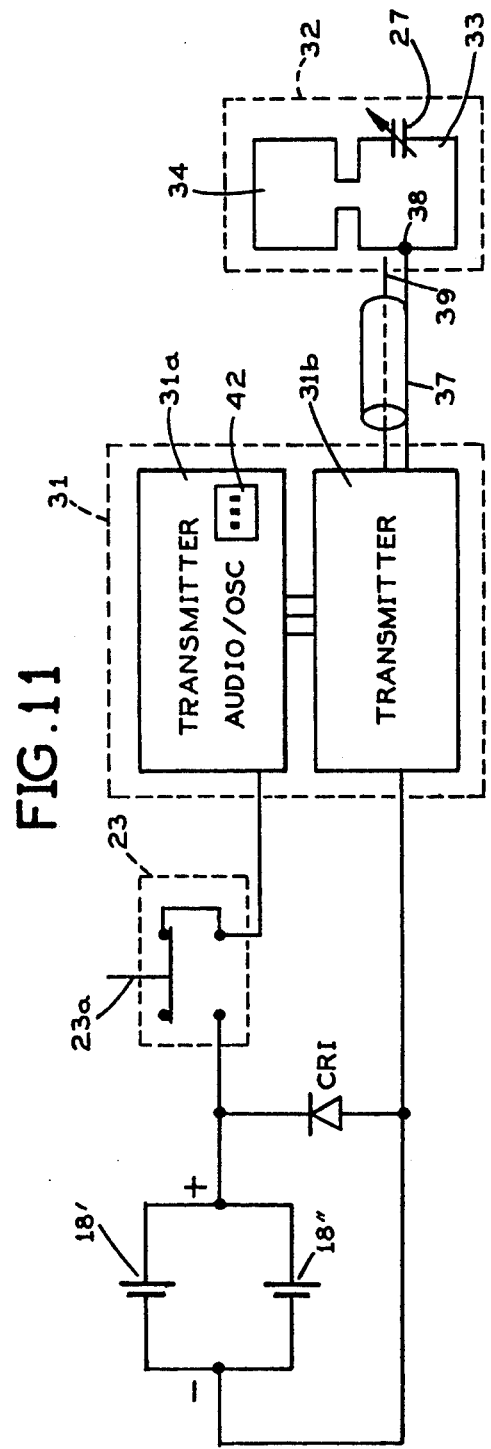
FIG. 11 is a circuit block diagram of the electrical construction of the invention.

FIG. 8 is a plan view of the first cover part 16 showing batteries 18', 18", the body 23 of the on/off switch, tuning capacitor 27, and two printed circuit boards 31, 32, and various wire sections interconnecting the parts of the transmitting device, including the circuit boards 31,32, the on/off switch 23, the batteries 18',18" and the tuning capacitor 27, according to the circuit diagram of FIG. 11.

Circuit board 32, seen from the edge, has a loop antenna etched thereon, and circuit board 31, also seen in edge view, has the electronic components that constitute the electronic circuits of the invention. The electronic components form a separate layer 31' on circuit board 31. The electronic circuits include a combined transmitter assembly with an audio circuit and RF oscillator 31a and a transmitter assembly 31b (FIG. 11). The electronic assemblies are per se conventional and are not described in greater detail, since the invention is not directed to the detailed construction of these assemblies.

Figure 9:
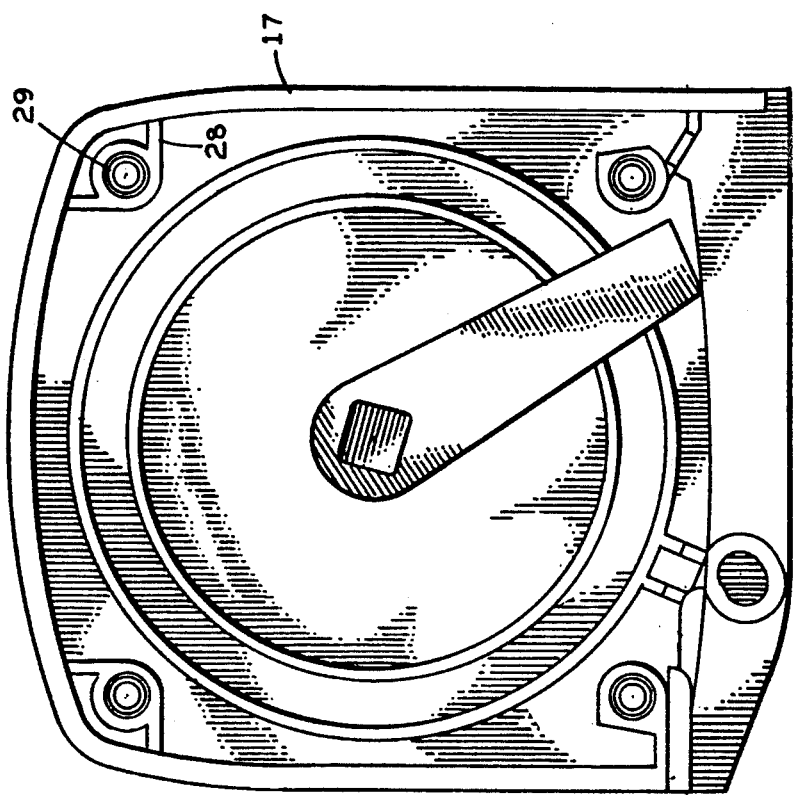
FIG. 9 is an elevational view showing a housing cover part.

FIG. 9 is an inside view of the tape housing cover part 17, shown in perspective view in FIG. 3.

Figure 10:
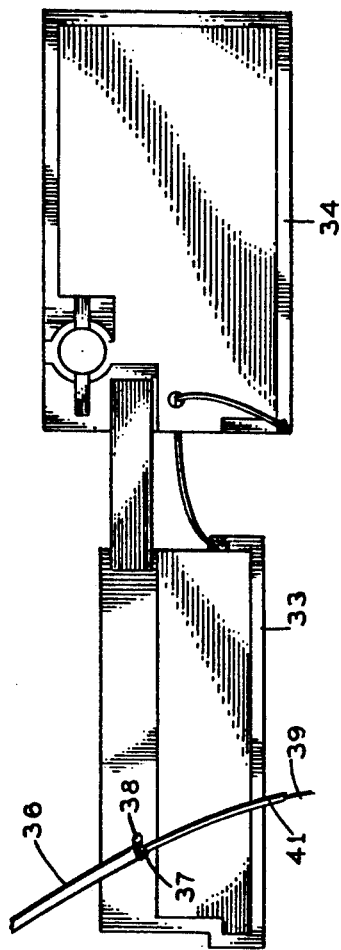
FIG. 10 is a diagrammatic view showing details of the internal antenna construction.

FIG. 10 is a plan view of the antenna structure composed of a first loop 33 and a second loop 34. The two loops are formed on printed circuit board 32 by the copper cladding of the board after removing the part not used for the antenna loops. Antenna loop 33 is coupled to the transmitter assembly 31b by means of a coaxial cable 36 having a braided shield conductor 37 attached at solder joint 38 to the first loop section 33. The center conductor 39 is left extending within its dielectric insulator 41 a distance of 0.75 inch beyond the braided shield conductor 37, which provides the radio frequency radiating part of the antenna.

FIG. 11 is a circuit schematic diagram of the invention showing the batteries 18',18", having a protective diode CR1 connected across the plus + and minus − poles of the batteries. The plus pole is connected via on/off switch 23 to the circuit board 31, while the minus pole is connected directly to a common ground return conductor of the circuit board 31.

A miniature microphone 42 is mounted on the transmitter audio/osc circuit board 31a, which is connected to the audio part of the board 31a and operates to modulate a radio frequency (RF) oscillator circuit on the board. The modulated radio frequency signal from the oscillator is connected to the transmitter board 31b which serves as a radio frequency power output stage, having an output connected via the coaxial cable 37 to antenna board 32.

The antenna tuning capacitor 27 is seen coupled in series with the second antenna loop 33 for tuning the antenna to maximum radiated radio frequency output.

I claim:

1. A concealed radio transmitting device comprising: a radio transmitter, an antenna coupled to said radio transmitter, power supply means for supplying electric power to said radio transmitter, an on/off device connected between said power supply means and said radio transmitter, and a housing shaped as a tape measure comprising a housing shell having two spaced apart opposing face panels and a peripheral wall connecting said two opposing face panels, adapted for containing said radio transmitter, said antenna, said power supply means and said on/off device, said housing further comprising a segment of flexible tape marked to resemble measuring tape, a housing slot in said housing shell through which a portion of said segment of flexible tape passes, guide means which slidably retain said segment of flexible tape along said peripheral wall such that said portion of said segment of flexible tape is extensible from said housing slot for creating the illusion to an observer of said housing of a functioning tape measure, and stop means for retaining said segment of flexible tape against complete removal from said housing shell.

2. A concealed radio transmitting device according to claim 1, including in said radio transmitter an audio input, and a microphone connected to said audio input for transferring audio signals to said transmitter.

3. A concealed radio transmitting device according to claim 2, including in said power supply means at least one electric battery connected to said on/off switch.

4. A concealed radio transmitting device according to claim 3, comprising in said at least one electric battery two interconnected alkaline batteries.

5. A concealed radio transmitting device according to claim 1, including in said radio transmitter an audio circuit, a radio frequency oscillator with an input connected to said audio circuit, and a radio frequency amplifier having an input connected to said radio frequency oscillator and an output connected to said antenna.

6. A concealed radio transmitting device according to claim 1, comprising a printed circuit board assembly for mounting said antenna.

7. A concealed radio transmitting device according to claim 6, comprising an antenna printed circuit board, first and second interconnected antenna loops disposed on said antenna printed circuit board, and coaxial connection from said radio transmitter to said antenna.

8. A concealed radio transmitting device according to claim 7, including a tuning capacitor connected to one of said antenna loops for tuning said antenna to maximum output.

9. A concealed radio transmitting device according to claim 1, wherein said on/off device is a push-on-switch.

10. A concealed radio transmitting device according to claim 1, including in said housing at least one compartment for containing said power supply means.

11. A concealed radio transmitting device according to claim 10, including at least one other compartment for containing said radio transmitter, and said antenna.

12. A concealed radio transmitting device according to claim 1, wherein said guide means comprises an axial guide slot in said segment of flexible tape, said axial guide slot having a guide slot end, and a guide projection extending from said housing shell through said guide slot, said guide projection comprising shaft portion having a tape retaining head, and wherein said stop means comprises said guide slot end and said guide projection.

* * * * *